United States Patent [19]

Bolding

[11] 4,364,715

[45] Dec. 21, 1982

[54] WAVE ACTUATED GAS COMPRESSION APPARATUS

[76] Inventor: Richard D. Bolding, P.O. Box 870, Rialto, Calif. 92376

[21] Appl. No.: 120,673

[22] Filed: Feb. 11, 1980

[51] Int. Cl.$^3$ .......................... F03B 13/12; F04B 43/12
[52] U.S. Cl. .................................. 417/100; 417/211; 417/332; 417/476
[58] Field of Search ............... 417/100, 103, 211, 330, 417/331, 332; 60/497, 498, 506

[56] References Cited

U.S. PATENT DOCUMENTS

| 671,592 | 4/1901 | Hamilton et al. | 417/331 |
|---|---|---|---|
| 1,078,323 | 11/1913 | Trull | 417/332 |
| 1,455,718 | 5/1923 | Delong | 417/100 |
| 1,620,258 | 3/1927 | Hoshafian | 60/506 |
| 3,771,920 | 11/1973 | Grant | 417/331 |
| 4,023,515 | 5/1977 | Theraldson | 417/332 X |
| 4,208,875 | 6/1980 | Tsubota | 417/331 |

FOREIGN PATENT DOCUMENTS 959434 3/1957 Fed. Rep. of Germany ...... 417/331

*Primary Examiner*—Richard E. Gluck
*Attorney, Agent, or Firm*—K. H. Boswell; Edward D. O'Brian

[57] ABSTRACT

An apparatus for harvesting wave energy by utilizing the movement of the waves has a support or foundation suitably anchored so as to be relatively stable to wave movement. Pivotally attaching to the support is a pontoon member. The pontoon is so pivoted on the support that it moves in respect to the support in response to wave movement. The interior of the pontoon is partitioned to include two chambers, one located at each end of the pontoon. Each of the chambers includes a gas inlet and a gas outlet which are equipped with one way valves which restrict gas flow into the chambers via the inlet and out of the chambers via the outlet. A gas collecting system is attached to the gas outlet. The two chambers are connected together near the bottom of the pontoon by a connecting member. A movable member within the interior of the pontoon which is operatively associated with the connection member moves in response to wave movement. The moving member seals the connecting member between the two chambers and as it moves it increases gas pressure in the chamber which it is moving towards causing gas to exit from that chamber out of the gas outlet and simultaneously decreases pressure from the other chamber causing gas to be drawn into the chamber through its gas inlet.

4 Claims, 6 Drawing Figures

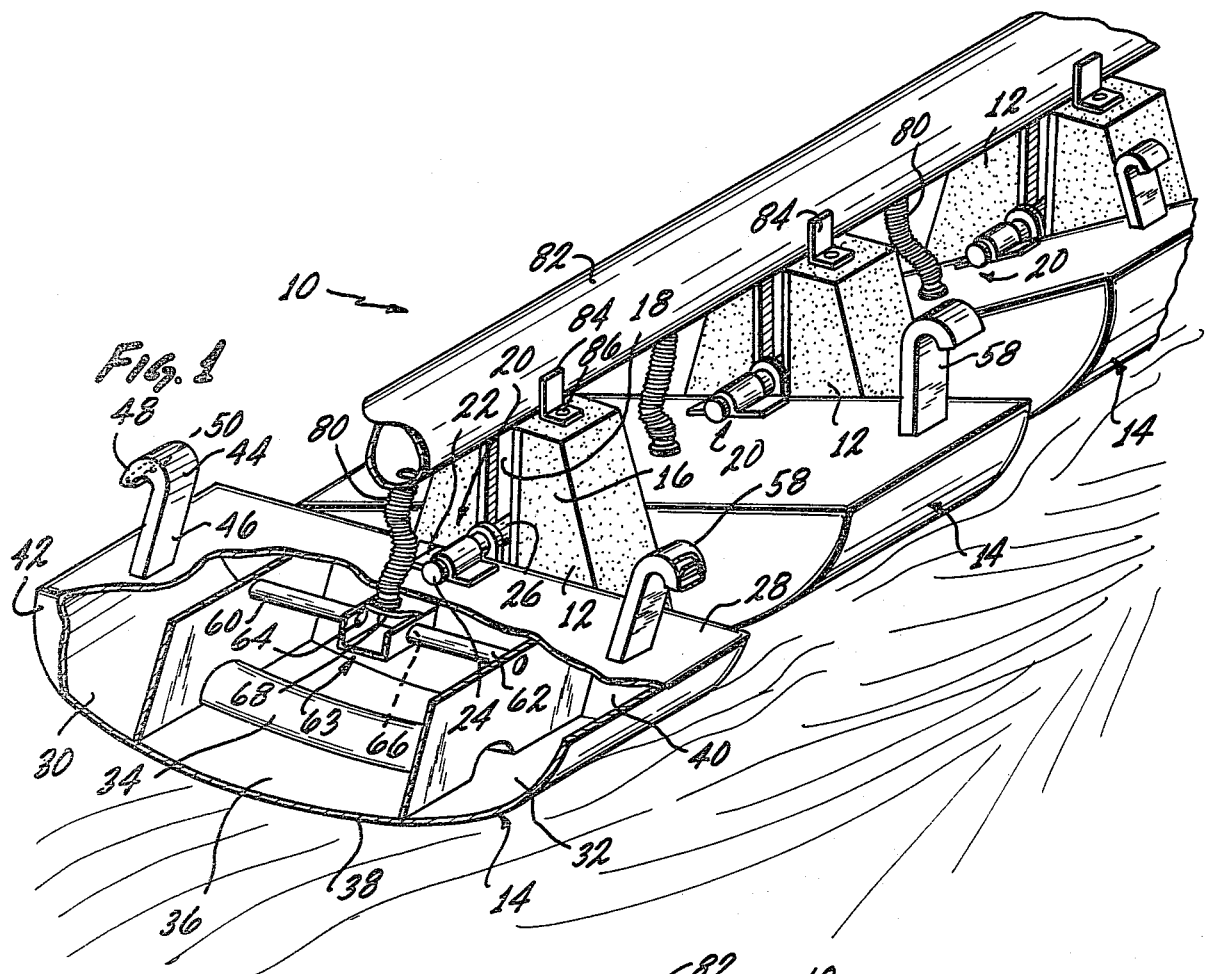
Fig. 1
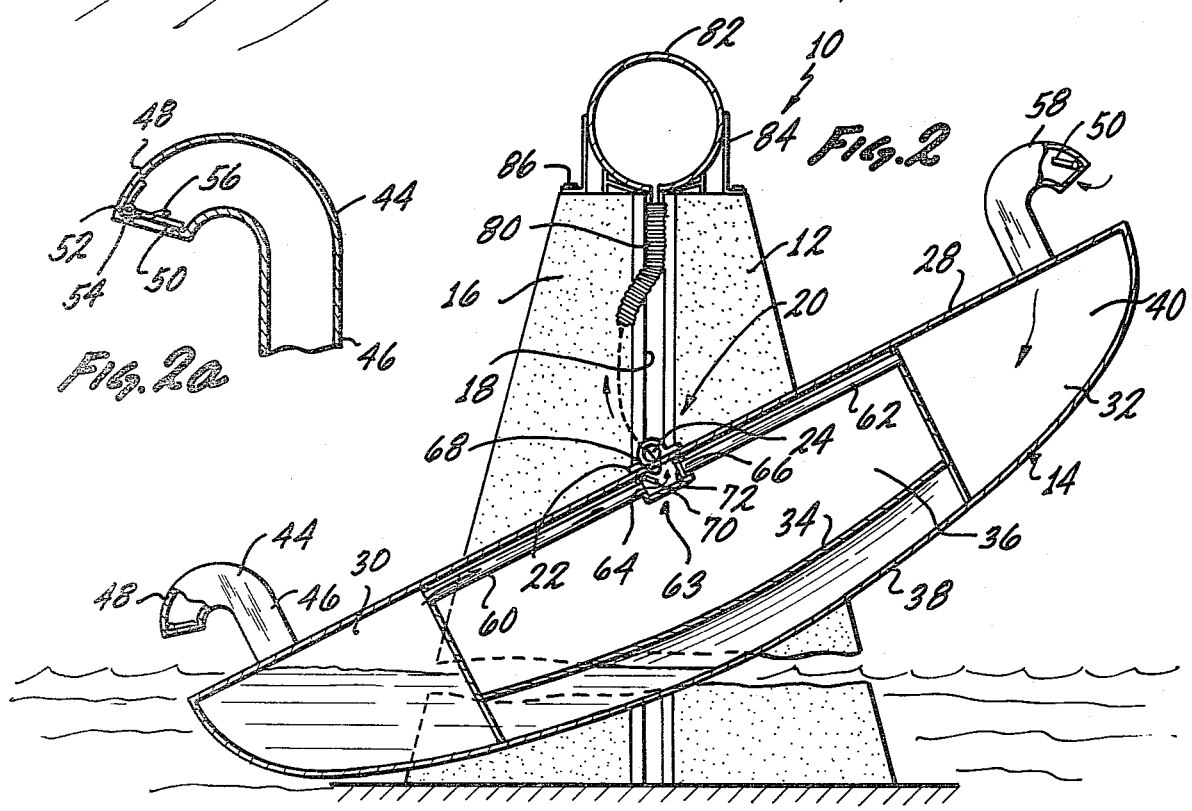
Fig. 2a
Fig. 2

U.S. Patent  Dec. 21, 1982  Sheet 2 of 2  4,364,715
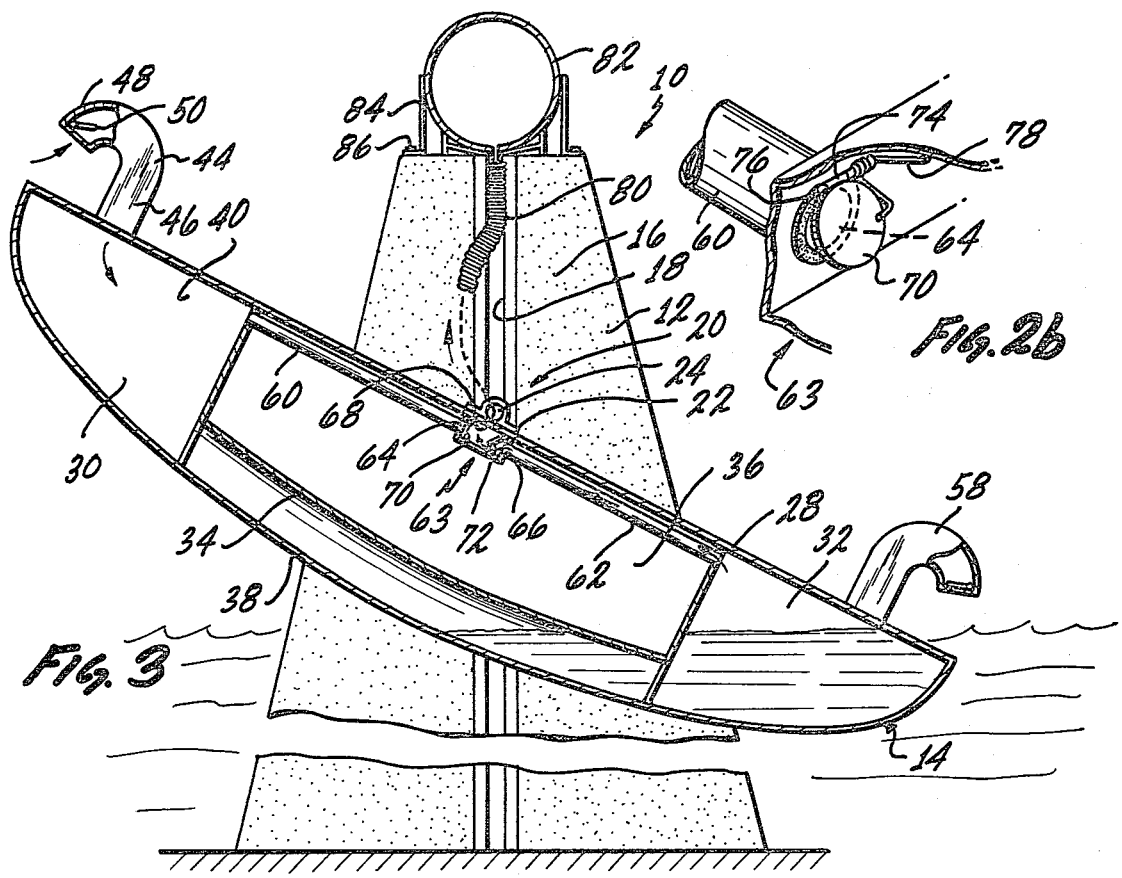
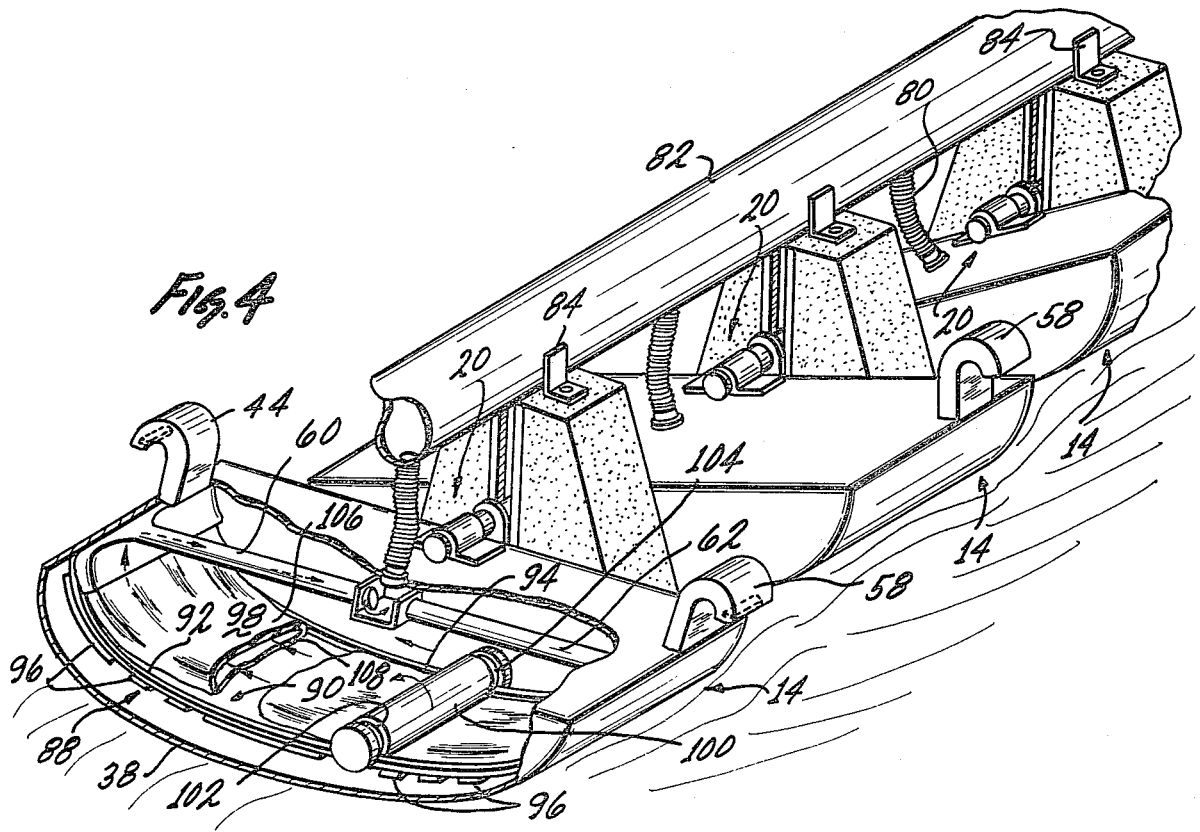

WAVE ACTUATED GAS COMPRESSION APPARATUS

BACKGROUND OF THE INVENTION

This invention is for an apparatus which utilizes wave movement to create a source of low pressurized gas. The low pressurized gas can then be used as an energy source.

Prior to the introduction of the petroleum age earlier in this century, consideration was given to utilizing wave energy as an energy source. With the advent of cheap petroleum for use as the major energy source the technological efforts directed to utilizing wave energy fell into disfavor. Recently it has become evident that other energy sources must be utilized to supplement the modern world's dependence on petroleum.

The oceans and other large bodies of water all have waves of different magnitudes which are generated by the effects of the wind and tides on the water surface. While each individual wave may in itself only represent a very small energy source the endless accumulation of one wave after another represents a very large untapped source of energy. To be useful any device which harvests the energy of the waves must be able to convert the wave movement to some other sort of useful energy which can be transported. Further, if a wave harvesting device is to be used in the ocean, the device must be able to contend with a variable water level caused by the tidal movement of the water.

BRIEF SUMMARY OF THE INVENTION

It is an object of this invention to be able to construct a device which can harvest the energy of waves. It is a further object to convert this wave energy into a low pressurized gas which can be used to run an auxiliary device such as a turbine for electrical power generation. Additionally it is an object of this invention to provide a wave energy harvesting device which can function regardless of water level caused by tidal movement.

These and other objects as will become evident from the remainder of this specification are met by providing an apparatus for harvesting the wave energy of a body of water by utilizing wave movement of the body of water to compress a gas which comprises: a support means suitably anchored in a fixed position with respect to wave movement such that the support means is substantially immovable with respect to the wave movement; at least one hollow pontoon means located adjacent to said support means and having a pivot means located on its external surface whereby said pontoon means can be pivotally mounted to said support structure and can move in response to wave movement. The pontoon means has at least two chambers located within its interior and each of these chambers has a gas inlet and a gas outlet. The gas inlet and gas outlet are equipped with one way valves such that gas can only flow into the chamber through the inlet and exit the chamber through the outlet. Attaching to the gas outlet is a gas collecting means for receiving gas passed through the gas outlet. A chamber connecting means is located in the interior of the pontoons and connects the interiors of the chambers with one another. Located within the interior of the pontoon is a movable means which is operatively associated with the chamber connecting means and is capable of sealing the chamber connecting means against gas flow between the two chambers. The moving means moves within the interior of the pontoon in respect to wave generated movement of the pontoons such that as the moving means moves within the interior of the pontoon the volume of one of the chambers is decreased pressurizing the gas within that chamber and forcing the gas through the outlet means attached to that gas chamber while simultaneously the volume of the other chamber is increased decreasing the pressure within that chamber and causing gas to flow through the inlet means of that chamber filling that chamber with gas.

Included on the support means is a pivot guide means mounted along the vertical axis of the support means. The pivot means mounted on the pontoon means attaches to the pivot guide means and is capable of moving up and down in a vertical direction in respect to said support means. This allows the pontoon to float on the surface of the water irrespective of the particular water depth caused by tidal action.

Generally a plurality of pontoons would be mounted to a plurality of support means located in a unified array. A common gas collecting manifold would interconnect each of the supporting means and be positioned to receive pressurized gas from each individual pontoon means.

BRIEF DESCRIPTION OF THE DRAWINGS

This invention will be best understood when taken in conjunction with the drawings wherein:

FIG. 1 is an oblique view in partial section of an array of the apparatuses of the invention;

FIG. 2 is a side elevational view in section of the invention shown in FIG. 1;

FIG. 2a is a detailed view of a portion of the invention shown in FIG. 2;

FIG. 2b is a detailed view of a second portion of the invention shown in FIG. 2;

FIG. 3 is a side elevational view in section similar to FIG. 2 except showing certain of the components in a different spacial relationship to one another; and FIG. 4 is an oblique view in partial section of an alternate embodiment of the invention.

The invention shown in the drawings and illustrated in the specification utilizes certain principles and/or concepts which are set forth in the claims appended to this specification. Those skilled in the art to which this invention pertains will realize that these concepts and/or principles could be utilized in a variety of different embodiments different from the exact embodiment illustrated herein. For this reason this invention is to be construed in light of the appended claims and is not to be construed as being limited to the exact embodiment herein illustrated.

DETAILED DESCRIPTION

The wave actuated gas compression apparatus 10 can be utilized as either a single unit having one support column 12 with a pontoon 14 attached thereto or it can be as illustrated in FIG. 1 made up of an array of support columns 12 and an array of pontoons 14. Since each individual support column 12 and pontoon 14 are identical, only one of them need be described in detail.

The support column 12 could be as illustrated in the drawings to be a monolithic structure such as a cast concrete column. The column 12 would be suitably anchored on the floor of the ocean or other large body of water. This type of construction would find its greatest utility in shallow water near the shore. The invention, however, is not limited to such shallow water usages. The support column 12, in place of a single monolithic column resting on the ocean's floor, could be part of a derrick (not illustrated or numbered) appropriately mounted by either long shafts or other suitable anchors in deep water. Further, the derrick could be floatable, but would be fixedly mounted to the ocean floor such that it would not substantially move in respect to wave movement.

Referring now to the support system illustrated in the drawings, the support column 12 is generally of a trapezoidal shape such that it has a flat side 16. Extending vertically along the flat side 16 is a pivot track 18. A movable pivot 20 composed of a bearing plate 22 attaching to pontoon 14, a pivot axle 24 fitting into bearing plate 22 also includes a pivot slide 26 which is appropriately mounted in pivot track 18. The pivot slide 26 is free to slide along the pivot track 18. However, it fixedly maintains pivot axle 24 perpendicular to the surface of flat side 16. Bearing plate 22 is suitably attached to top surface 28 of pontoon 14 by welding or other equivalent methods.

The interior of pontoon 14 is hollow. It is divided up into several sections. These include first chamber 30, second chamber 32 and conducting tube 34. The center section of the pontoon is occupied by hollow chamber 36. The curved bottom plate 38 and the two side plates 40 and 42 complete the pontoon.

In the embodiment illustrated in FIGS. 1 through 3 portions of first and second chambers 30 and 32 and conducting tube 34 are filled with water. The remaining portions of first and second chambers 30 and 32 and hollow chamber 36, however, are filled with air and as such the pontoon 14 is lighter than the water and will float in the water. Depending upon the materials from which the pontoon 14 is constructed a particular percentage of the pontoon will be, of course, located underneath the water's surface. However, no matter from what materials the pontoon is constructed the pontoon will never sink but will always float up and down within the pivot track 18.

Because the pontoon 14 will float and because the support column 12 is provided with the pivot track 18 the pontoon 14 will rise and fall in respect to the support column 12 depending upon the water level caused by tidal variations and the like.

Attaching to first chamber 30 is an air inlet tube 44. It is generally of a "U" shape having one leg 46 longer than the other leg 48. Leg 46 opens up into chamber 30. Leg 48 is equipped with a one way flapper valve 50 as best seen in FIG. 2a. Flapper valve 50 is suitably mounted to leg 48 via an axle 52 which fits into bearing 54. A small spring 56 biases flapper valve 50 in a closed position. An identical air inlet tube 58 fits on second chamber 32. Air inlet tube 58 is equipped with an identical flapper valve 50, axle 52, bearings 54 and spring 56.

Located within hollow chamber 36 are gas outlet conduits 60 and 62. In the center of hollow chamber 36 mounted to the bottom side of top plate 28 is gas coupling 63. It is equipped with three ports 64, 66 and 68. Gas outlet conduit 60 connects with the top portion of first chamber 30 and port 64. This forms a gas conducting pathways between the chamber 30 and the coupling 63. Likewise gas outlet conduit 62 connects second chamber 32 with the gas coupling 63. Located inside of the gas coupling 63 over the ports 64 and 66 are identical flapper valves 70 and 72 (Only one of which is illustrated in FIG. 2b). The flapper valve 70 is appropriately mounted by axle 74 to bearings 76 and is biased in a closed position against port 64 by spring 78. The parts for flapper valve 72 are identical to those of flapper valve 70 and are not seperately identified or numbered.

A flexible tube 80 connects to port 68 on gas coupling 63. The tube 80 leads upwardly from the pontoon 14 to gas collecting manifold 82. Flexible tube 80 forms a pathway for gas from the gas coupling 63 to the manifold 82. As shown in FIG. 1 when a plurality of supports 12 and pontoons 14 are used the manifold 82 extends across the top of each of the supports 12 and is appropriately maintained there by L brackets collectively identified by the numeral 84. The L brackets 84 are suitably bolted by bolts 86 to support column 12 and are appropriately attached to manifold 82 by welding or the like. Flexible tubes 80 are used in order to form a continuous pathway between the individual pontoons 14 and the manifold 82 as the pontoons 14 rise and fall in respect to the support column 12 because of the tides.

As noted before, conducting tube 34 and portions of chambers 30 and 32 are filled with water. Looking now at FIGS. 2 and 3 it can be seen that in response to a wave rolling past the support column 12 the pontoon 14 is pivoted about pivot 20 such that chamber 30 is depressed downwardly into the wave trough causing the water within the chambers 30 and 32 and conducting tube 34 to flow downwardly into chamber 30. This compresses the gas, i.e. air, trapped within the chamber 30 and forces it through outlet conduit 60 into the gas coupling 63 and further into manifold 82. Meanwhile, as the water flows into first chamber 30 it leaves chamber 32 creating a partial vacuum therein. When this vacuum is sufficient to overcome the bias of spring 56 flapper valve 50 in gas inlet tube 58 opens allowing air to flow into chamber 32. As the next wave passes chamber 30 is elevated by the wave crest and chamber 32 is now depressed downwardly into the wave trough and the water flows from chamber 30 through conducting tube 34 into chamber 32. This then compresses the air in chamber 32 ultimately forcing it into the manifold 82 and refills chamber 30 with air. With each wave the motion of the pontoon 14 causes air to be displaced into the manifold 82.

The conducting chamber 34 is located on the bottom of the pontoon 14 so as to provide a pathway for the water to flow between the chambers 30 and 32 yet provide a seal against gas transfer between these two chambers. The gas outlet conduits 60 and 62 are located in the upper portion of the pontoon in order to readily provide access pathways for gas but not for water. The flapper valves 70 and 72 are appropriately opened by the increase of pressure within chambers 30 or 32 and appropriately closed and sealed against the conduits 60 and 62 when this pressure is decreased upon movement of the pontoon 14.

The air inlet tubes 44 and 58 project a sufficient distance above the surface such that they are never submerged within the water forcing the pontoons to fill up with excess water. Each of the individual pontoons 14 as indicated in FIG. 1 are free to rock as a solitary unit. Thus as a wave passes a series of these they each adjust to the particular contour of the wave surface wherein they are located. Because there are no mechanical linkages between the individual pontoons 14 an array or bank of pontoons can effectively utilize the energy stored in the ever changing contours of the waves as their crest and troughs pass the pontoons.

In the alternate embodiment depicted in FIG. 4 certain components are the identicals to those found in the previous embodiment. For this reason they will not be seperately explained and the numbers previously used for those components which are identical will be repeated. Within the interior of the pontoons 14 is a track member 88. This track member curves along the surface of bottom plate 38. The track member 88 includes a surface 90 and two flanges or rails 92 and 94 located on either side of the surface 90 along the axis of the pontoon 14. Suitable supports collectively identified by the numeral 96 suspend the track member 88 within the pontoon 14.

Located within the pontoon 14 on the surface of surface 90 between flanges 92 and 94 is a flexible bladder 98. Air inlet tubes 44 and 58 and outlet conduits 60 and 62 are appropriately attached to either end of the bladder 98. Resting on top of the bladder 98 is a rolling member 100. Rolling member 100 has cutout sections 102 and 104 located proximal to either end which fit over the flanges 92 and 94. The interaction of the flanges 92 and 94 with the cutout sections 102 and 104 appropriately maintain rolling member 100 positioned on top of bladder 98 while allowing the rolling member 100 to roll back and forth within the interior of the pontoon 14.

The bladder 98 is compressed between the rolling member 100 and the surface 90 forming an air tight seal between the upper wall 106 of the bladder 98 and the lower wall 108. The interaction of rolling member 100 with surface 90 divides the bladder into two chambers. These chambers are of a varying volume depending upon the position of the rolling member 100 within the pontoon 14 which in turn depends upon the position of the pontoon 14 in the wave. Thus as the pontoon rocks with the wave motion the rolling member rolls within the pontoon compressing the air in the bladder on the downward side of the pontoon forcing air via gas outlet conduit 60 into gas coupling 63.

The remainder of the interior of the pontoon 14 not occupied by the bladder 98 is depressurized and sealed during manufacture. As the rolling member 100 rolls the chamber of the bladder 98 on the upward side of the rolling member is caused to expand into the depressurized zone within the pontoon. This causes air to pass through gas inlet tube 58 filling this chamber with air. When the motion of the pontoon is reversed and the rolling member rolls toward the other end squeezing the bladder 98 as it rolls the one way valve in the gas inlet tube 58 closes trapping the air in this section of the bladder and causing this air to be expelled from the bladder 100 via gas outlet conduit 62 as the rolling member 100 travels.

The pontoon 14 can be made of any suitable material such as wood, metal or plastic. The bladder 98 is constructed of a suitable flexible material such as rubber or the like. The rolling member 100 is preferably constructed of a dense metal since it must supply a compression force against the bladder 98 sufficient to devoid one side of the bladder of air as the rolling member 100 travels under the influence of gravity along the track 88. The gas collection manifold 82 will preferably be a metal pipe impervious to air leakage and the flexible tubes 80 would preferably be a rubbery material of sufficient flexibility to stretch yet have suitable strength wherein they are not deformed by large waves cascading over the surface of the pontoons. While the pivot 20 is shown attached to the top plate 28 of the pontoon 14 it could also be suitably attached on either side plate 40 or 42 of the pontoon 14.

I claim:

1. An apparatus for harvesting the wave energy of a body of water by utilizing wave movement of the body of water to compress a gas which comprises:

a support means suitably anchored in a fixed position with respect to wave movement such that said support means is not substantially movable in response to wave movement;

a hollow pontoon means located adjacent to said support means, said pontoon means including a pivot means located on the external surface of said pontoon means, said pontoon means pivotally mounted about said pivot means to said support means and movable about said pivot means in respect to said support means in response to wave movement;

said pontoon means having at least two chambers located in the interior of said pontoon means, each of said chambers having a gas inlet means connecting to the ambient atmosphere and a gas outlet means, each of said gas inlet means and said gas outlet means including a one way valve means restricting gas flow into said chambers through said gas inlet means and restricting gas flow out of said chambers through said gas outlet means;

a gas collecting means located in the interior of said pontoon means and connecting the interiors of said chambers to each other;

a movable means located in the interior of said pontoon means and operatively associated with said chamber connecting means, said movable means sealing said chamber connecting means against gas flow between said chambers, said movable means moving within the interior of said pontoon means in response to movement of said pontoon means such that as said movable means moves within the interior of said pontoon means simultaneously the gas pressure in one of said chambers is increased while the gas pressure in the other of said chambers is decreased causing gas to flow through the outlet means of said chamber wherein said gas pressure is increased into said gas collecting means and causing gas to flow from the ambient atmosphere through the inlet means of said chamber wherein gas pressure is decreased;

said support means includes a pivot guide means mounted on said support means along the vertical axis of said support means;

said pivot means slidably attaching to said pivot guide means such that said pontoon means is capable of moving up and down in a vertical direction in respect to said support means;

said pontoon means comprises an elongated pontoon having a first chamber located at one end of said pontoon and a second chamber located at the other end of said pontoon;

said chamber connecting means comprises a fluid conducting tube located at the bottom of said pontoon and connecting the bottom of each of said chambers to one another and forming a fluid pathway between said chambers;

said movable means comprises a quantity of liquid located in said chambers and in said fluid conducting tube so as to be capable of flowing from said first chamber through said tube to said second chamber when said pontoon pivots in one direction about said pivot means and flowing from said second chamber to said first chamber when said pontoon pivots in the opposite direction about said pivot means;

said gas collecting means includes a gas collecting manifold located on said support means and a flexible connecting means operatively attached between said gas collecting manifold and said gas outlet means such that gas passes from said gas outlet means through said flexible connecting means to said gas collecting manifold;

a plurality of said support means located proximal to each other in a unified array;

a plurality of said pontoon means each pivotally attached to one of said support means;

said gas collecting manifold located on said plurality of said support means and forming a continuous gas collecting pathway between said support means;

a plurality of said flexible connecting means equal in number to said number of said pontoon means, one end of each of said felxible connecting means attaching to one of said pontoon means and the other end of all of said flexible connecting means attaching to said gas collecting manifold;

said gas outlet means comprises a first and a second gas conduit, one end of said first gas conduit attaching to the upper portion of said first chamber and one end of said second gas conduit attaching to the upper portion of said second chamber, and a gas coupling having three gas ports, the other end of both said first and second gas conduits attaching to two of said gas ports;

said flexible connecting means attaching to the other of said gas ports such that gas can be conducted from said first and said second chambers through said first and said second conduits to said gas coupling and from said gas coupling into said flexible coupling means.

2. The apparatus of claim 1 including:

each of said first and said second gas conduits having a one way gas valve located on said end attaching to said gas coupling.

3. An apparatus for harvesting the wave energy of a body of water utilizing wave movement of the body of water to compress a gas which comprises:

a support means suitably anchored in a fixed position with respect to wave movement such that said support means is not substantially movable in response to wave movement;

a hollow pontoon means located adjacent to said support means, said pontoon means including a pivot means located on the external surface of said pontoon means, said pontoon means pivotally mounted about said pivot means to said support means and movable about said pivot means in respect to said support means in response to wave movement;

said pontoon means having at least two chambers located in the interior of said pontoon means, each of said chambers having a gas inlet means connecting to the ambient atmosphere and a gas outlet means, each of said gas inlet means and said gas outlet means including a one way valve means restricting gas flow into said chambers through said gas inlet means and restricting gas flow out of said chambers through said gas outlet means;

a gas collecting means connected to said gas outlet means to receive gas from said gas outlet means;

a chamber connecting means located in the interior of said pontoon means and connecting the interiors of said chambers to each other;

a movable means located in the interior of said pontoon means and operatively associated with said chamber connecting means, said movable means sealing said chamber connecting means against gas flow between said chambers, said movable means moving within the interior of said pontoon means in response to movement of said pontoon means such that as said movable means moves within the interior of said pontoon means simultaneously the gas pressure in one of said chambers is increased while the gas pressure in the other of said chambers is decreased causing gas to flow through the outlet means of said chamber wherein said gas pressure is increased into said gas collecting means and causing gas to flow from the ambient atmosphere through the inlet means of said chamber wherein said gas pressure is decreased;

said support means includes a pivot guide means mounted on said support surface means along the vertical axis of said support means;

said pivot means slidably attaching to said pivot guide means such that said pontoon means is capable of moving up and down in a vertical direction with respect to said support means;

said pontoon means comprises an elongated pontoon having a first chamber located at one end of said pontoon and a second chamber located at the other end of said pontoon;

said chamber connecting means comprises a fluid conducting tube located at the bottom of said pontoon and connecting the bottom of each of said chambers to one another and forming a fluid pathway between said chambers;

said movable means comprises a quantity of liquid located in said chambers and in said fluid conducting tube so as to be capable of flowing from said first chamber through said tube to said second chamber when said pontoon pivots in one direction about said pivot means and flowing from said second chamber to said first chamber when said pontoon pivots in the opposite direction about said pivot means;

a third chamber located within said pontoon and positioned between said first and said second chambers, said third chamber having a hollow interior isolated from said first and said second chambers such that said quantity of liquid located in said first and said second chambers is isolated from said hollow interior of said third chamber.

4. The apparatus of claim 3 wherein:

said fluid conducting tube traverses through at least a portion of said third chamber forming a fluid conducting pathway through said third chamber between said first and said second chambers.

* * * * *